Figure 1:
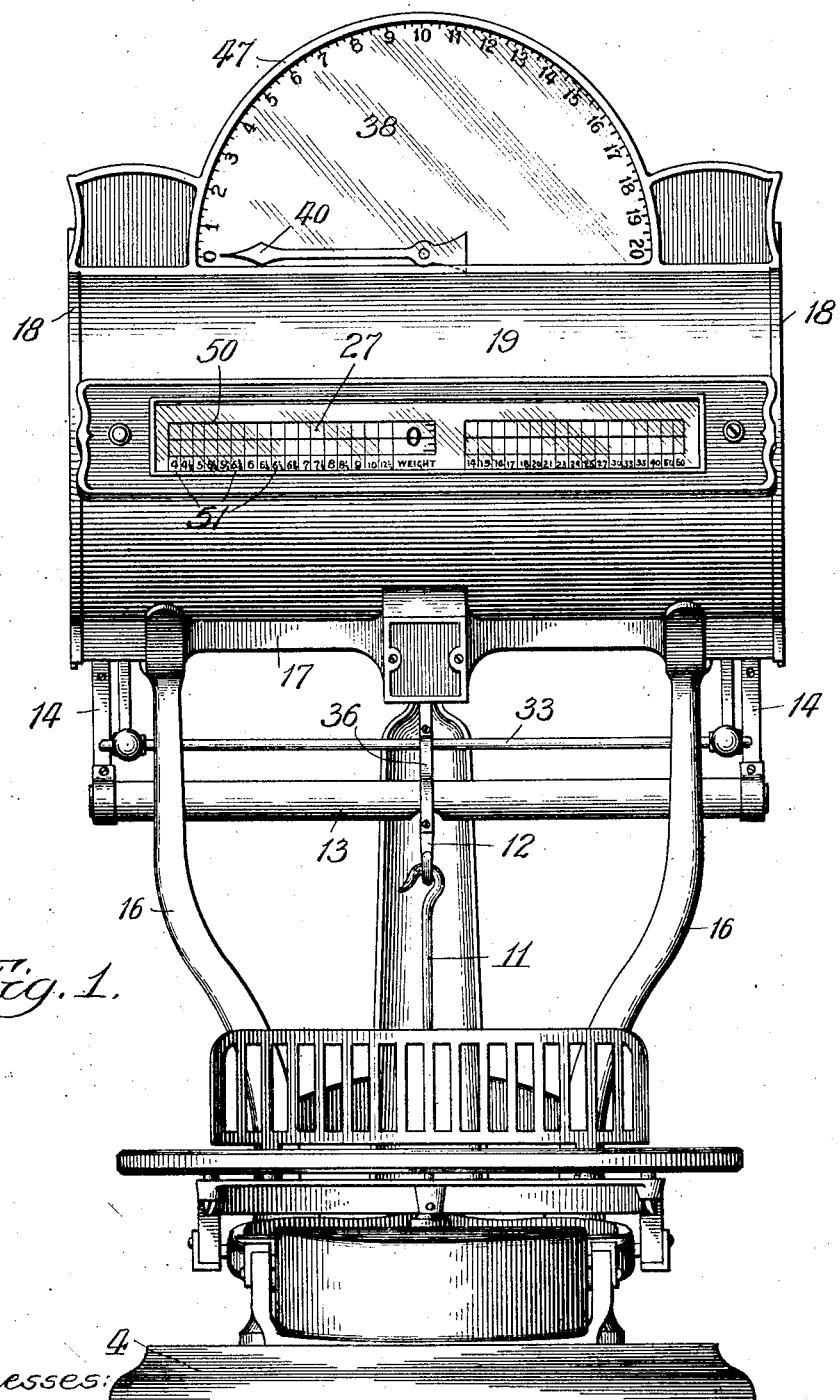

J. HOPKINSON.
COMPUTING SCALE.
APPLICATION FILED AUG. 2, 1910.

1,050,832.

Patented Jan. 21, 1913.
4 SHEETS—SHEET 1.

Witnesses:
John Enders
Henry A. Parks

Inventor.
Joseph Hopkinson,
By Sheridan, Wilkinson, Scott & Richmond
Attys.

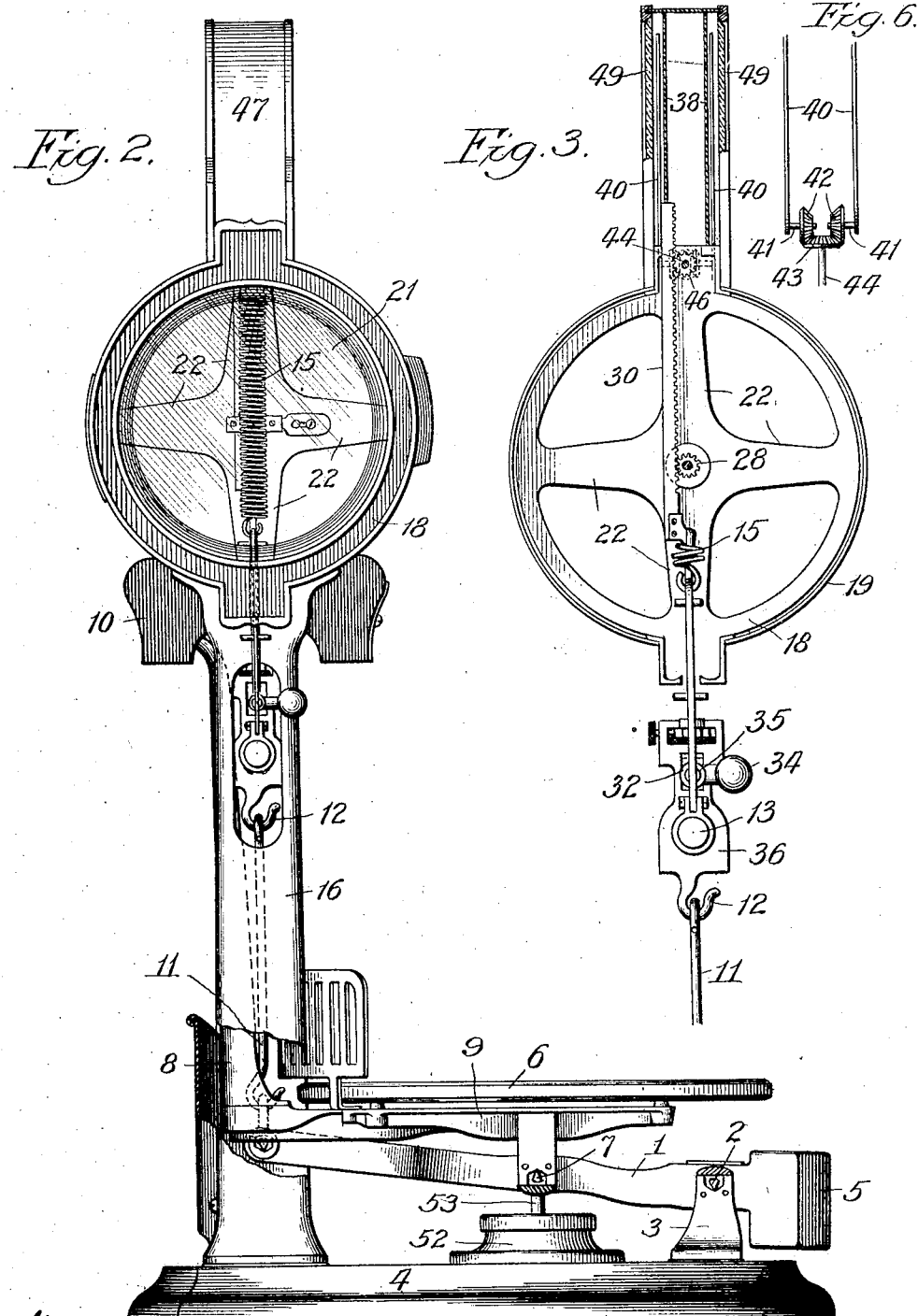

J. HOPKINSON.
COMPUTING SCALE.
APPLICATION FILED AUG. 2, 1910.

1,050,832.

Patented Jan. 21, 1913.

4 SHEETS—SHEET 3.

Fig. 4

Witnesses:
John Enders
Henry A Parks

Inventor:
Joseph Hopkinson,
by Sheridan, Wilkinson, Scott & Richmond
Attys

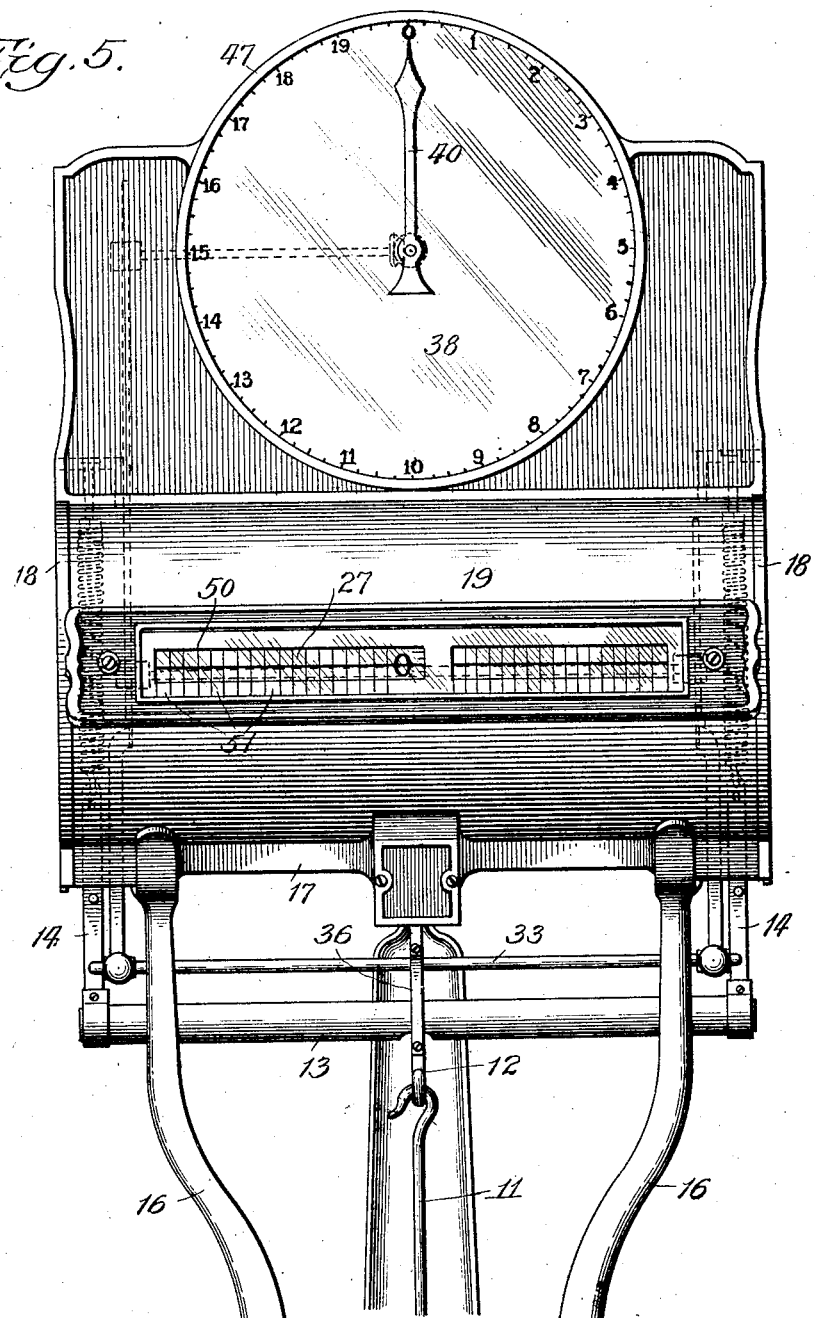

UNITED STATES PATENT OFFICE.

JOSEPH HOPKINSON, OF DAYTON, OHIO, ASSIGNOR TO COMPUTING SCALE COMPANY, OF DAYTON, OHIO, A CORPORATION OF OHIO.

COMPUTING-SCALE.

1,050,832.

Specification of Letters Patent. Patented Jan. 21, 1913.

Application filed August 2, 1910. Serial No. 575,073.

*To all whom it may concern:*

Be it known that I, JOSEPH HOPKINSON, a citizen of the United States, residing at Dayton, in the county of Montgomery and State of Ohio, have invented certain new and useful Improvements in Computing-Scales, of which the following is a specification.

The object of my invention is to provide a computing scale embodying means for facilitating the reading of the weights and prices registered thereby.

Particular objects of the invention and the particular means whereby the results referred to are secured will clearly appear in the following description and claims, taken in connection with the accompanying drawings, in which—

Figure 1 is a front view of one form of weighing scale embodying my invention. Fig. 2 is a side view of the structure shown in Fig. 1, certain parts being broken away for the purpose of more clearly exhibiting the structure. Fig. 3 is a sectional side view of the upper part of the structure shown in Fig. 2, the upper part of the section being taken at the center of the structure as viewed in Fig. 4 and the lower part being sectioned near the end. Fig. 4 is a sectional front view of the upper part of the scale, the section being taken at the center of the mechanism as viewed in Fig. 3. Fig. 5 is a front view of the upper part of the scale embodying my invention and showing a circular instead of a semi-circular dial at the upper portion thereof. Fig. 6 is a fragmentary view showing the gears for operating the index hand upon the upper dial.

The scale which I have selected for the purpose of illustrating my invention is of a type now in extensive use and comprises a scale beam and platform operatively connected to a cylindrical price-chart, which revolves within a casing provided with a sight opening or slot through which the chart may be viewed. The chart is provided with circumferential rows of graduations and numerals, there being one row of graduations and numerals for each price per unit of weight which the scale is designed to register, and the cylindrical chart may also, as usual, be provided with a circumferential series of graduations and numerals for reading the weight in pounds and ounces or other gravitational units. As will more fully appear from the following description, the ends of the cylindrical casing are left open, the openings being filled with glass, if desired, for the purpose of admitting light to the interior of the price chart. According to my invention the price chart is constructed of translucent material. In the positions ordinarily used in shops and elsewhere the sources of light are found to be located behind the scales, that is, on the side opposite the platform. When the lights are so located the part of the cylindrical chart which is exposed through the sight opening in the casing is not well illuminated. By providing the inclosing casing with open or transparent ends, however, and constructing the cylindrical chart of translucent material, light proceeding from the side of the scales opposite the platform and sight opening is admitted through the open or transparent ends of the casing to the interior of the translucent cylindrical chart, thereby causing the opaque numerals and graduations thereon to appear in sharp relief when viewed through the sight opening in the casing. It will be apparent of course that this feature of my invention may be applied to price and weight charts of other than cylindrical form, though in the drawings of this application I have chosen to illustrate it in connection with a cylindrical chart. In order to further facilitate the reading of the weights registered by the scales, I have provided a weight dial above the price chart, such weight dial preferably being provided with graduations facing in opposite directions, in order that the same may be read from either the front or back of the scales. Coöperating with the double weight dial, in those cases where the same is made double, are index hands actuated by the scale beam or other part of the mechanism having a movement proportional to the weight of the substance being weighed. It will be apparent that my supplemental weight dial may be constructed to read either upon one or both sides, and that the cylindrical or other price chart may or may not be provided with weight graduations in addition to those appearing upon the supplemental dial. The supplemental dial occupies a conspicuous position and thereby renders the reading of the weight especially convenient, and owing to the fact that the weight is the basic quantity from which the prices are found either by a mental operation, or by an observation of the price chart, this feature has been found to be one of great utility.

The main scale beam 1 is provided with knife edges 2 resting upon the standard 3 rising from the base 4 and is provided with a counterweight 5 upon the forward side of the fulcrum formed by the knife edges. A platform 6, which may take any of the usual forms used for receiving goods of different characters, rests upon knife edges 7 secured to the scale beam 1. An upwardly projecting arm 8 connected to the base 9 of the platform 6 projects upwardly and at its upper end enters the casing 10 where suitable check mechanism, not shown, is provided for the purpose of keeping the platform 6 horizontal without preventing its moving vertically under the weight of the loads placed thereon. The rear end of the scale beam 1 is engaged by a hook upon the lower end of a steelyard rod 11 which at its upper end is provided with a hook, which engages the hook 12 secured to the cross arm 13. Secured to the ends of the cross arm 13 and extending upwardly therefrom are draft rods 14, which at their upper ends are secured to the draft springs 15.

Rising from the base 4 of the scales are supporting pillars 16 connected at their upper ends by the horizontal support 17. Circular end frames 18 carry between them the cylindrical casing 19. Upon their outer sides the end frame rings 18 carry inturned flanges 20, which support circular plates of glass 21. At their inner edges the frame rings 18 support spiders consisting of radial arms 22, which at their centers support bearing brackets 23 in which the shaft 24 is journaled.

Fixedly mounted upon the shaft 24 are spiders 25, the outer ends of the arms of which take the form of circular flanges 26. Supported around the flanges 26 of the spiders 25 is the translucent cylindrical chart 27, bearing circular rows of graduations for the different prices to be registered and also for the weights if desired.

Pinions 28 are secured to the shaft 24 near the ends thereof and outside of the cylindrical price chart 27. The shaft 24 and its pinions 28 project through central openings 29 in the stationary spiders 22 and the pinions are engaged by vertical racks 30, which at their lower ends are secured to rack bars 31. The lower ends of the rack bars 31 are provided with sleeves 32, which loosely surround a cross-rod or evener 33. Weights 34 projecting horizontally from the lower ends of the rack bars 31 hold the racks 30 in engagement with the pinions 28, and the outer ends of the evener 33 are forked at 35 in order that the movements of the evener 33 may be guided by the draft rods 14.

The rod 33 is actuated by the engagement of the central part thereof with the plate 36, which carries the hook 12 to which the steelyard rod 11 is attached as above stated. Means which form no part of my present invention are provided for adjusting the relation between the evener 33 and the plate 36, such means being utilized for the purpose of securing the proper relation between the scale beam and cylindrical price chart.

The draft springs 15 at their upper ends are connected to bolts 37, which depend from the upper part of the rings 18.

Rising above the cylindrical casing 19, as shown in Fig. 1, is a semi-circular dial 38 graduated in units of weight. There may either be a single one of these dials facing either toward the platform or front of the scales or toward the back of the scales to be observed by the customer, or, as shown in Figs. 2 and 3, there may be two such dials, one facing in each direction and each provided with an index hand. Referring to the double arrangement illustrated, the index hands 40 are pivotally mounted at the center of the semi-circular dials, and secured to the stub shafts 41 upon which the hands are mounted, are bevel gears 42 lying within the space between the two dials. Engaging the bevel gears 42 is a bevel gear 43 mounted upon a shaft 44 supported in bearings 45 upon the top of the casing 19. The shaft 44 extends to the side of the casing and at its outer end carries a pinion 46, which is engaged by one of the racks 30.

Extending upwardly from the cylindrical casing 19 is a casing 47 surrounding the dials 38 and their indicator hands 40. Opposite the dials 38 the casing 47 is provided with sight openings preferably protected by glass plates 49.

The cylindrical casing 19, as usual in scales of this character, is provided upon its forward side with a longitudinal slot 50 through which the graduations upon the cylindrical price chart 27 may be read. Upon the casing 19 along one of the edges of the slot 50 are a series of numerals 51 designating the different prices corresponding to the graduations upon the price chart, and opposite the series of graduations upon the cylindrical chart representing weight units the word "Weight" may be marked upon the casing 19, as shown in Fig. 1.

The counterweight 5 and the weight of the various moving parts entering into the structure of the scale are such that when the platform is unloaded the zero designation upon the several circles of graduations upon the price chart will rest opposite the slot 50, and the index hand or hands 40 will rest opposite the zero point upon the supplemental weight dial 38. When a substance to be weighed is placed upon the platform the lever 1 will be depressed until the tension of the draft springs 15 counteracts the weight thereof. In order to dampen the vibrations of the draft springs, a dash-pot 52 is placed below the platform and its plunger connected to a stem 53 secured to the scale beam or platform. The downward movement of the scale beam is transmitted through the connection 36 to the evener 33 and thence to the racks 30, thereby through their engagement with the pinions 28 imparting rotation to the cylindrical chart proportional to the weight of the substance upon the platform. One of the racks 30 being in engagement with the pinion 46 upon the shaft 44 the index hand or hands 40, through the engagement of their bevel gears 41 with the bevel gear 43, will also be rotated an amount proportional to the weight of the substance upon the platform. By this means a conspicuous indication of the weight registered is displayed upon the dials 38 in a position to be easily observed by the customer without effort or by the clerk operating the scales. By reason of the fact that the ends of the casing 19 are open to the transmission of light the graduations upon the cylindrical price chart 27 can be easily observed even though the light is situated upon the side of the scale opposite the platform. When this is the case the readings upon the cylindrical price chart can easily be made by means of the light transmitted through the translucent chart from its interior; while if the light is located in front of the scales, that is, on the platform side thereof, the readings upon the cylindrical chart can be made as usual by means of reflected light.

While I have shown and described my invention in connection with a particular form of scales now in extensive use, it will be apparent that the principle of my invention may be applied to scales of different construction and operation.

I claim:—

1. In a weighing scale, a scale beam, a platform mounted thereon, a variable counterbalancing element, a rotary cylindrical price chart, a pinion secured to said cylindrical price chart, a graduated weight dial, a rotatably mounted index hand coöperating therewith, a pinion, means for operatively connecting said pinion with said index hand, a rack connected to said scale beam and engaging said pinions, and an operating connection between said scale beam and counterbalancing element.

2. In a weighing scale, a scale beam, a platform supported thereon, a variable counterbalancing element, a rotary cylindrical price chart above and to the rear of said platform, a pinion secured to said cylindrical price chart, a graduated weight dial above said price chart, a movable index hand coöperating therewith, a pinion, means operatively connecting said pinion with said index hand, a rack extending upwardly from said scale beam into engagement with said pinions, and an operating connection between said scale beam and counterbalancing element.

3. In a weighing scale, a scale beam, a platform supported thereon, a variable counterbalancing element, a slotted casing above and to the rear of said platform, a shaft and cylindrical price chart rotatably mounted in said casing, a pinion secured to said shaft, a graduated weight dial above said casing, a rotatably mounted index hand coöperating with said dial, a bevel gear in fixed relation to said index hand, a shaft, a pinion secured to one end of said shaft and a bevel gear secured to the other end thereof and in engagement with said first mentioned bevel gear, a rack connected to said scale beam and engaging both of said pinions, and an operating connection between said scale beam and counterbalancing element.

4. In a weighing scale, a scale beam, a platform supported thereon, a variable counterbalancing element, a slotted cylindrical casing extending transversely of said scale beam and located above and to the rear of said platform, a shaft and cylindrical price chart thereon rotatably mounted in said casing, a pinion secured to said shaft, a graduated weight dial located centrally above said casing, a rotatably mounted index hand coöperating with said dial, a bevel gear in fixed relation to said index hand, a shaft extending parallel to said cylindrical price chart, a pinion secured to the outer end of said shaft, a bevel gear secured to the inner end thereof and in engagement with said first-mentioned beveled gear, a rack connected to said scale beam and extending upwardly adjacent the end of said casing and engaging both of said pinions, and an operating connection between said scale beam and counterbalancing element.

5. In a weighing scale, a scale beam, a platform mounted thereon, graduated weight dials facing in opposite directions, a casing surrounding said dials and provided with slight openings opposite thereto, rotatably mounted index hands in operative relation with said dials, a bevel gear in fixed relation to each of said index hands, a shaft, a bevel gear upon said shaft engaging said index hand bevel gears, a pinion upon said shaft, and a rack engaging said pinion and operatively connected to said scale beam.

6. In a weighing scale, a scale beam, a platform mounted thereon, a variable counterbalancing element rotatably mounted cylindrical price chart above and to the rear of said platform, a shaft upon which said price chart is mounted, a pinion upon the end of said shaft, two oppositely facing weight dials above said price chart, a casing surrounding said price chart and weight dials, said casing being provided with a slot opposite said price chart and with sight openings opposite said weight dials, rotatably mounted index hands in coöperative relation with said weight dials, a bevel gear mounted in fixed relation with each of said index hands, a shaft, a bevel gear upon said shaft engaging said index hand bevel gears, a pinion upon said shaft, a rack engaging both of said above mentioned pinions, operating connections between said rack and said scale beam, and an operating connection between said scale beam and variable counterbalancing element.

In testimony whereof, I have subscribed my name.

JOSEPH HOPKINSON.

Witnesses:
I. G. KENNEDY,
WALTER A. SCOTT.

---

Correction in Letters Patent No. 1,050,832.

It is hereby certified that in Letters Patent No. 1,050,832, granted January 21, 1913, upon the application of Joseph Hopkinson, of Dayton, Ohio, for an improvement in "Computing-Scales," an error appears in the printed specification requiring correction as follows: Page 3, line 125, after the word "element" insert a comma and the article a; and that the said Letters Patent should be read with this correction therein that the same may conform to the record of the case in the Patent Office.

Signed and sealed this 18th day of March, A. D., 1913.

[SEAL.]

C. C. BILLINGS,

*Acting Commissioner of Patents.*